US010715584B2

(12) United States Patent
Anwer et al.

(10) Patent No.: US 10,715,584 B2
(45) Date of Patent: *Jul. 14, 2020

(54) MULTIUSER APPLICATION PLATFORM

(71) Applicant: Microsoft Technology Licensing, LLC, Redmond, WA (US)

(72) Inventors: Muhammad Usman Anwer, Seattle, WA (US); Jonathan D. Wiswall, Woodinville, WA (US); Abolade Gbadegesin, Sammamish, WA (US); Logananth Seetharaman, Kirkland, WA (US); Kunal Ramesh Gandhi, Redmond, WA (US); John Michael Sheehan, Seattle, WA (US); John R. Schmeichel, Bellevue, WA (US); Chin H. Lam, Bellevue, WA (US); Kelly W. Connell, Renton, WA (US); Jeremy B. Gup, Seattle, WA (US); Daniel R. Mitchell, Redmond, WA (US); Jill Cary Bender, Seattle, WA (US); Adam Michael Smith, Sammamish, WA (US); Adam D. Stritzel, Redmond, WA (US); Jason G. Salameh, Bothell, WA (US); Denise Su-Li Goh, Everett, WA (US); Fan Xiao, Bothell, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 331 days.

This patent is subject to a terminal disclaimer.

(21) Appl. No.: 15/390,282

(22) Filed: Dec. 23, 2016

(65) Prior Publication Data
US 2017/0374138 A1 Dec. 28, 2017

Related U.S. Application Data

(60) Provisional application No. 62/355,601, filed on Jun. 28, 2016.

(51) Int. Cl.
*H04L 29/08* (2006.01)
*G06F 9/445* (2018.01)
(Continued)

(52) U.S. Cl.
CPC .............. *H04L 67/10* (2013.01); *G06F 9/445* (2013.01); *G06F 9/541* (2013.01); *G06F 21/31* (2013.01);
(Continued)

(58) Field of Classification Search
CPC .......... G06F 9/541; G06F 21/31; G06F 9/445; H04L 67/10; H04L 67/141; H04L 67/306; H04L 65/403; H04L 67/025; H04L 67/303

See application file for complete search history.

(56) References Cited

U.S. PATENT DOCUMENTS 6,430,567 B2   8/2002  Burridge
6,463,078 B1  10/2002  Engstrom et al.
(Continued)

FOREIGN PATENT DOCUMENTS

WO   2001097022 A2   12/2001

OTHER PUBLICATIONS

Wong, et al., "Operating System Support for Multi-User, Remote, Graphical Interaction", In Proceedings of the USENIX Annual Technical Conference, Jun. 18, 2000, 13 pages.
(Continued)

*Primary Examiner* — Kim T Nguyen
(74) *Attorney, Agent, or Firm* — Fiala & Weaver P.L.L.C.

(57) ABSTRACT

Techniques for multiuser application platform are described. Generally, a multiuser application allow interaction by multiple different users with a single executing instance of the application. Implementations include a multiuser operating system and a multiuser application programming interface
(Continued)

that enable interaction by multiple users with an executing instance of a multiuser application.

20 Claims, 8 Drawing Sheets

(51) Int. Cl.
  *G06F 9/54* (2006.01)
  *G06F 21/31* (2013.01)
  *H04L 29/06* (2006.01)
(52) U.S. Cl.
  CPC .......... *H04L 65/403* (2013.01); *H04L 67/025* (2013.01); *H04L 67/141* (2013.01); *H04L 67/303* (2013.01); *H04L 67/306* (2013.01)

(56) References Cited

U.S. PATENT DOCUMENTS

| | | | |
|---|---|---|---|
| 6,850,953 | B1 | 2/2005 | Deshpande et al. |
| 7,770,134 | B2 | 8/2010 | Evans et al. |
| 7,895,645 | B2 | 2/2011 | Bodepudi et al. |
| 8,556,713 | B2 | 10/2013 | Pilip |
| 9,201,709 | B2 | 12/2015 | Momchilov et al. |
| 9,985,999 | B1* | 5/2018 | Simon .................. H04L 65/403 |
| 2004/0192440 | A1 | 9/2004 | Evans et al. |
| 2008/0244219 | A1 | 10/2008 | Kobayashi |
| 2009/0187834 | A1 | 7/2009 | Rapo et al. |
| 2011/0145341 | A1 | 6/2011 | Hampel |
| 2013/0067473 | A1* | 3/2013 | Olson .................. G06F 9/445 718/100 |
| 2014/0073289 | A1 | 3/2014 | Velasco |
| 2015/0106691 | A1 | 4/2015 | Arzuffi et al. |
| 2016/0277508 | A1* | 9/2016 | Byskal .................. H04L 67/142 |
| 2016/0332081 | A1 | 11/2016 | Marr et al. |
| 2017/0033989 | A1 | 2/2017 | Toprani et al. |
| 2017/0374156 | A1* | 12/2017 | Anwer .................. G06F 9/541 |
| 2019/0258430 | A1* | 8/2019 | Chang .................. G06F 3/1204 |

OTHER PUBLICATIONS

"Interix in a Multi-User Windows TSE Environment", Published on: Jun. 23, 2007 Available at: https://technet.microsoft.com/en-us/library/bb463198.aspx.

"Building Multiuser-Aware Apps", Published on: Jun. 23, 2015 Available at: https://source.android.com/devices/tech/admin/multiuser-apps.html#enabling_a_singleton_component.

Koren, et al., "Introduction to multi-user applications", Retrieved on: Jun. 9, 2016 Available at: https://msdn.microsoft.com/en-us/windows/uwp/xbox-apps/multi-user-applications.

"Non Final Office Action Issued in U.S. Appl. No. 15/425,942", dated Feb. 14, 2019, 19 Pages.

"International Search Report and Written Opinion Issued in PCT Application No. PCT/US2017/037094", dated Dec. 22, 2017, 12 Pages.

Bobba, et al., "Using Attribute-Based Access Control to Enable Attribute-Based Messaging", In the Annual Conference on Computer Security Applications, Dec. 11, 2006, 11 Pages.

"International Search Report and Written Opinion", Application No. PCT/US2017/038636, dated Sep. 14, 2017, 11 pages.

"Final Office Action Issued in U.S. Appl. No. 15/425,942", dated Jun. 6, 2019, 22 Pages.

"Non Final Office Action Issued in U.S. Appl. No. 15/425,942", dated Jan. 10, 2020, 24 Pages.

* cited by examiner

MULTIUSER APPLICATION PLATFORM

RELATED APPLICATIONS

This application claims priority under 35 U.S.C. Section 119(e) to U.S. Provisional Patent Application No. 62/355,601, filed Jun. 28, 2016 and titled "Multiuser Aware Applications," the entire disclosure of which is hereby incorporated by reference.

BACKGROUND

Traditional operating systems (OS) rely on separate interactive sessions for each user. They may allow multiple users to switch in and out of an operating system and application experiences, but user interactions and integration with services and features is typically limited to one user at a time.

Enabling parallel application functionality on a traditional operating system typically requires an application developer to conceive their own user model that is managed in the application layer. This fundamentally limits the user-related customization that can be achieved since there is no support for multiple users in a same application session.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for multiuser application platform are described. Generally, a multiuser application allow interaction by multiple different users with a single executing instance of the application. Implementations include a multiuser operating system and a multiuser application programming interface that enable interaction by multiple users with an executing instance of a multiuser application.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Identical numerals followed by different letters in a reference number may refer to difference instances of a particular item.

DETAILED DESCRIPTION

Implementations discussed herein provide a multiuser application platform. The platform, for instance, includes a multiuser operating system (OS) infrastructure and application model that allows multiple users to consume applications and OS services sequentially and/or simultaneously. For example, multiple users can be authenticated (e.g., logged in) to a multiuser OS at the same time, allowing the OS shell to activate multiuser aware applications. As new users authenticate and deauthenticate, the multiuser OS can send information about the new active users to a multiuser application. The multiuser application can then tailor an app experience to the active user based on user-scoped preferences, settings, and data handled by the multiuser OS and modified by the app via user aware platform affordances, such as multiuser application programming interfaces (APIs). Techniques described herein also enable simultaneous combined in-app collaboration. For instance, multiple users can work on a document within a multiuser application together at the same time using user-context queues from the system for the app to know which user is performing which action.

The tight OS-app integration described herein allows for rapid switching of an app experience between different users, without requiring a multiuser application to close and launch again with content customized to a new user. Thus, a programming model is enabled that facilities porting a single user application to a multiuser application without significant changes to an application codebase. Further, a multiuser application can execute as a single user application dependent on an application launch context, such as on a traditional OS that only supports single user applications.

Thus, techniques described herein reduce computing resources required to create and execute multiuser applications by providing native multiuser functionality implemented at the OS level. For instance, memory and data storage resource usage is reduced by not requiring an application to include functionality to manage multiuser authentication and input attribution to execute in a multiuser mode.

Having presented an overview of techniques for a multiuser application platform, consider now an example environment in which techniques described herein may be implemented.

Figure 1:
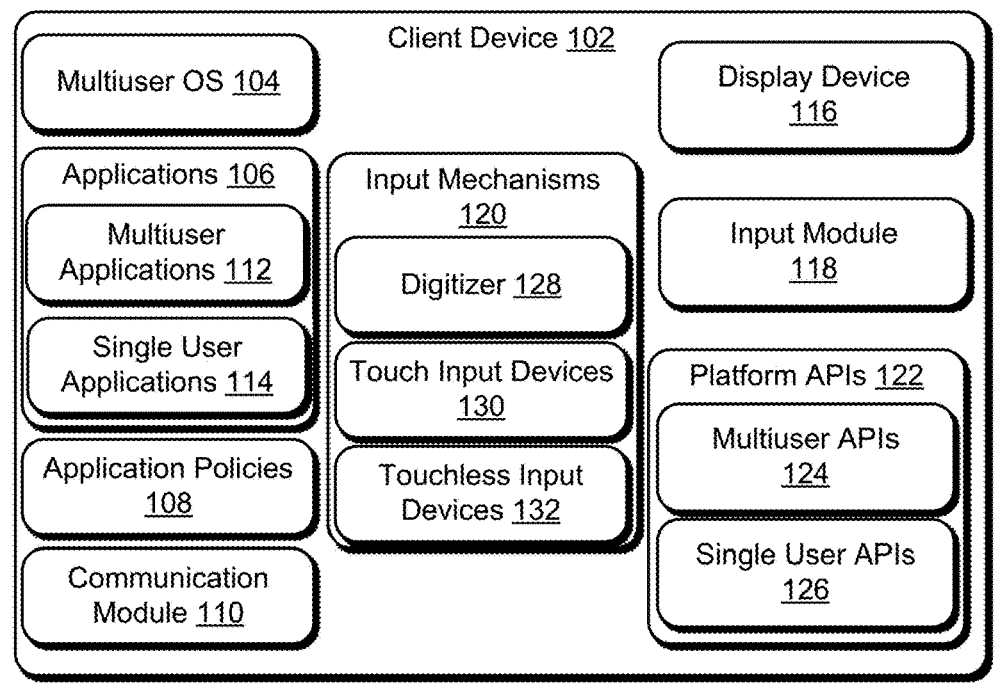
FIG. 1 is an illustration of an environment in an example implementation that is operable to employ techniques discussed herein.
Figure 1:
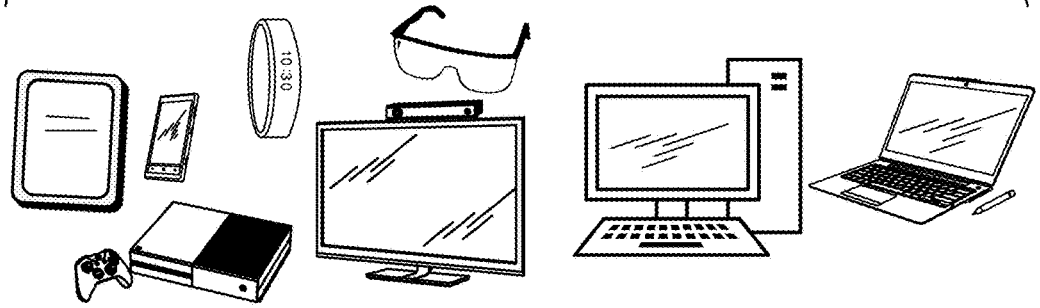

FIG. 1 is an illustration of an environment 100 in an example implementation that is operable to employ techniques for multiuser aware applications discussed herein. Environment 100 includes a client device 102 which can be embodied as any suitable device such as, by way of example and not limitation, a smartphone, a tablet computer, a portable computer (e.g., a laptop), a desktop computer, a wearable device, and so forth. In at least some implementations, the client device 102 represents a smart appliance, such as an Internet of Things ("IoT") device. Thus, the client device 102 may range from a system with significant processing power, to a lightweight device with minimal processing power. One of a variety of different examples of a client device 102 is shown and described below in FIG. 8.

The client device 102 includes a variety of different functionalities that enable various activities and tasks to be performed. For instance, the client device 102 includes a multiuser operating system ("OS") 104, applications 106, application policies 108, and a communication module 110. Generally, the multiuser OS 104 is representative of functionality for abstracting various system components of the client device 102, such as hardware, kernel-level modules and services, and so forth. The multiuser OS 104, for instance, can abstract various components (e.g., hardware, software, and firmware) of the client device 102 to the applications 106 to enable interaction between the components and the applications 106. As further described below, the multiuser OS 104 also implements various aspects of techniques for the multiuser application platform described herein.

The applications 106 represent functionalities for performing different tasks via the client device 102. Examples of the applications 106 include a word processing application, a spreadsheet application, a web browser, a gaming application, and so forth. The applications 106 may be installed locally on the client device 102 to be executed via a local runtime environment, and/or may represent portals to remote functionality, such as cloud-based services, web apps, and so forth. Thus, the applications 106 may take a variety of forms, such as locally-executed code, portals to remotely hosted services, and so forth.

The applications 106 include multiuser applications 112 and single user applications 114. The multiuser applications 112 represent applications that that are configured to allow multiple users to consume the applications and OS services sequentially and/or simultaneously. Different attributes of the multiuser applications 112 are detailed throughout this disclosure. The single user applications 114 are representative of applications that are configured to run based on a single user identity. For instance, the single user applications 114 are not configured to enable multiple user identities to be logged in and/or active within a single instance of a single user application 114.

As further detailed below, the multiuser OS 104 is configured to manage launching and execution of the multiuser applications 112 and the single user applications 114 and based on a variety of different contextual factors. For instance, the application policies 108 indicate different behaviors that can be applied to different execution scenarios for the applications 106. The application policies 108, for instance, specify allowed and disallowed behaviors that apply based on whether a particular application 106 is a multiuser application 112 or a single user application 114. Further, the application policies 108 can enforce behaviors for the applications 106 based a particular device type and/or execution platform on which the applications 106 are launched.

The communication module 110 is representative of functionality for enabling the client device 102 to communication over wired and/or wireless connections. For instance, the communication module 110 represents hardware and logic for communication via a variety of different wired and/or wireless technologies and protocols.

The client device 102 further includes a display device 116, an input module 118, and input mechanisms 120. The display device 116 generally represents functionality for visual output for the client device 102. Additionally, the display device 116 represents functionality for receiving various types of input, such as touch input, pen input, and so forth. The input module 118 is representative of functionality to enable the client device 102 to receive input (e.g., via the input mechanisms 120) and to process and route the input in various ways.

The client device 102 further includes platform application programming interfaces (APIs) 122, which include multiuser APIs 124 and single user APIs 126. Generally, the platform APIs 122 enable various aspects of techniques for multiuser application platform discussed herein. The multiuser APIs 124, for instance, enable an OS shell of the multiuser OS 104 to send information about a new active user to a multiuser application 112, which can then tailor an app experience to this user based on user scoped preferences, settings, and data handled by the multiuser OS 104 and modified by the multiuser application 112. The single user APIs 126 enable single user applications 114 to launch and execute via the multiuser OS 104, while enforcing single user application behaviors. Thus, app developers can integrate their applications into a multiuser aware environment using the multiuser APIs and/or the single user APIs with minimal cognitive load.

The input mechanisms 120 generally represent different functionalities for receiving input to the client device 102, and include a digitizer 128, touch input devices 130, and touchless input devices 132. Examples of the input mechanisms 120 include gesture-sensitive sensors and devices (e.g., such as touch-based sensors and movement-tracking sensors (e.g., camera-based)), a mouse, a keyboard, a stylus, a touch pad, accelerometers, a microphone with accompanying voice recognition software, and so forth. The input mechanisms 120 may be separate or integral with the display device 116; integral examples include gesture-sensitive displays with integrated touch-sensitive or motion-sensitive sensors. The digitizer 128 represents functionality for converting various types of input to the display device 116 and the touch input devices 130 into digital data that can be used by the client device 102 in various ways, such as for generating digital ink, responding to touch input, and so forth.

The touchless input devices 132 generally represent different devices for recognizing different types of non-contact input, and are configured to receive a variety of touchless input, such as via visual recognition of human gestures, object scanning, voice recognition, color recognition, and so on. In at least some embodiments, the touchless input devices 132 are configured to recognize gestures, poses, body movements, objects, images, and so on, via cameras. An example camera, for instance, can be configured with lenses, light sources, and/or light sensors such that a variety of different phenomena can be observed and captured as input. For example, the camera can be configured to sense movement in a variety of dimensions, such as vertical movement, horizontal movement, and forward and backward movement, e.g., relative to the touchless input devices 132. Thus, in at least some embodiments, the touchless input devices 132 can capture information about image composition, movement, and/or position.

Having described an example environment in which the techniques described herein may operate, consider now a discussion of some example implementation scenarios in accordance with one or more embodiments. The implementation scenarios may be implemented in the environment 100 discussed above, and/or any other suitable environment.

Figure 2:
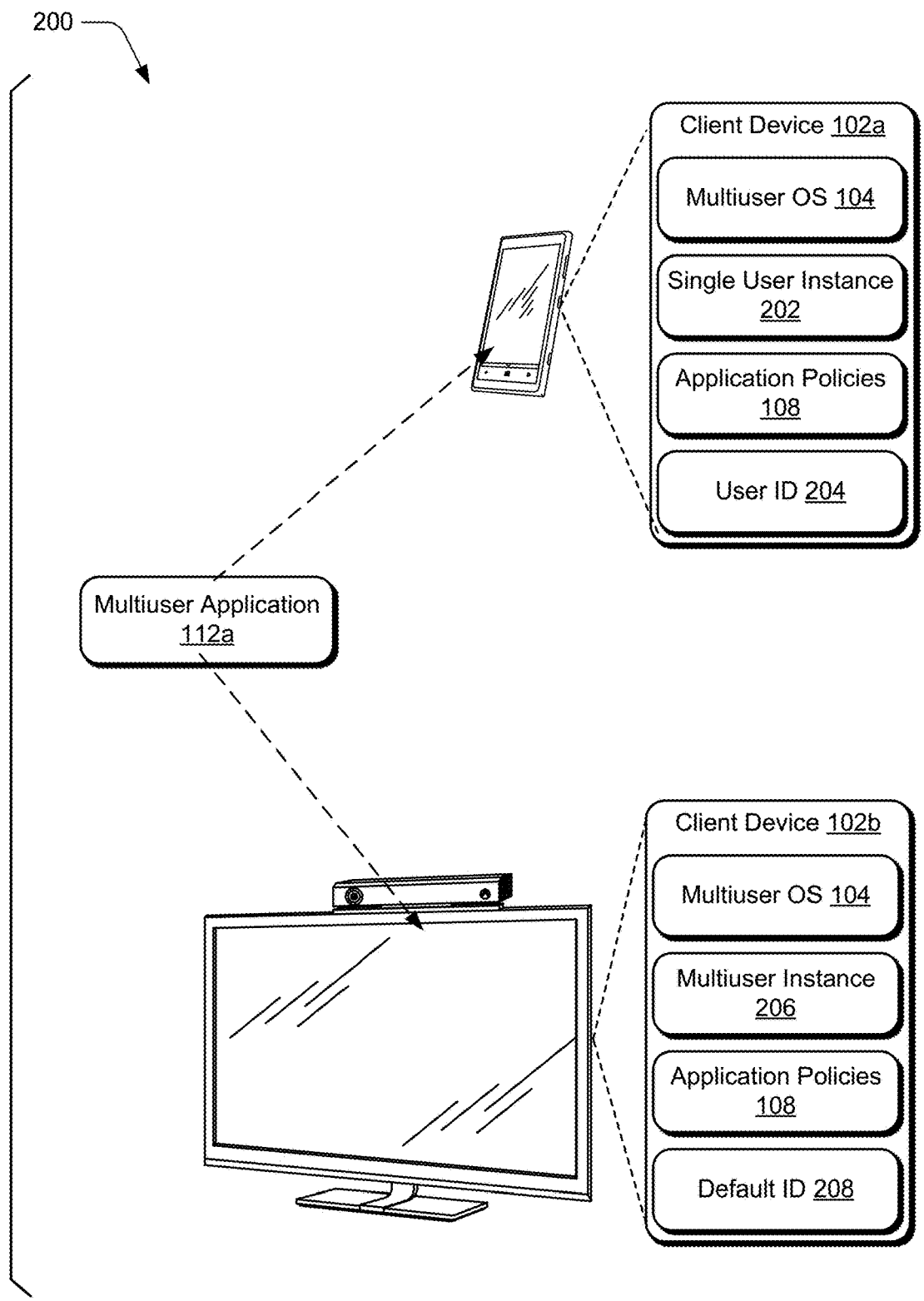
FIG. 2 depicts an example implementation scenario for launching a multiuser application in accordance with one or more embodiments.

FIG. 2 depicts an example implementation scenario 200 for launching a multiuser application in accordance with one or more implementations. The scenario 200 includes a client device 102*a* and a client device 102*b*, which represent different instances of the client device 102 described above. According to techniques for multiuser application platform described herein, the client device 102*a* launches (e.g., starts and executes) a multiuser application 112*a* as a single user instance 202. Generally, the single user instance 202 represents an execution of the multiuser application 112*a* as a single user application instance. The single user instance 202, for example, is launched based on a user identity (ID) 204 associated with the client device 102*a*.

According to one or more implementations, the multiuser OS 104 causes the multiuser application 112*a* to launch on the client device 102*a* as the single user instance 202 based on the application policies 108. The application policies 108, for example, are evaluated based on attributes of the client device 102*a* to determine that the multiuser application 112*a* is to launch as the single user instance 202 on the client device 102*a*. Different attributes that can be considered by the application policies 108 include device type (e.g., device form factor), device resources (e.g., processor bandwidth, memory resources, and so forth), typical device usage scenarios (e.g., single user device, multiuser device, and so on), device settings (e.g., default to single user or multiuser launch), user preferences, and so forth.

Accordingly, the single user instance 202 executes on the client device 102*a*, and a user can interact with the single user instance 202 as a single user application and based on the user ID 204. For instance, the single user instance 202 is tailored to various content and permissions of the user ID 204.

Further to the scenario 200, the multiuser application 112*a* launches on the client device 102*b* as a multiuser instance 206. Generally, the multiuser instance 206 represents execution of the multiuser application 112*a* as a multiuser aware application. The multiuser instance 206, for example, launches and executes using a default ID 208. In at least some implementations, the default ID 208 is not associated with a particular individual user profile, but represents a default system ID that is used to execute multiuser applications.

According to one or more implementations, the multiuser OS 104 causes the multiuser application 112*a* to launch as the multiuser instance 206 based on the application policies 108. The application policies 108, for example, are evaluated based on attributes of the client device 102*b* to determine that the multiuser application 112*a* is to launch as the multiuser instance 206 on the client device 102*b*.

Accordingly, the application policies 108 can specify based on different criteria (e.g., device and/or user attributes) whether the multiuser application 112*a* is to launch as a multiuser application instance or a single user application instance. Further, the versions of the multiuser application 112*a* executed by the client device 102*a* and the client device 102*b* can include identical code that is executed differently on the different devices, such as based on differing attributes of the devices and the application policies 108.

Generally, different users can interact with the multiuser instance 206 while the multiuser instance 206 is running. Consider, for example, the following implementation scenarios.

Figure 3:
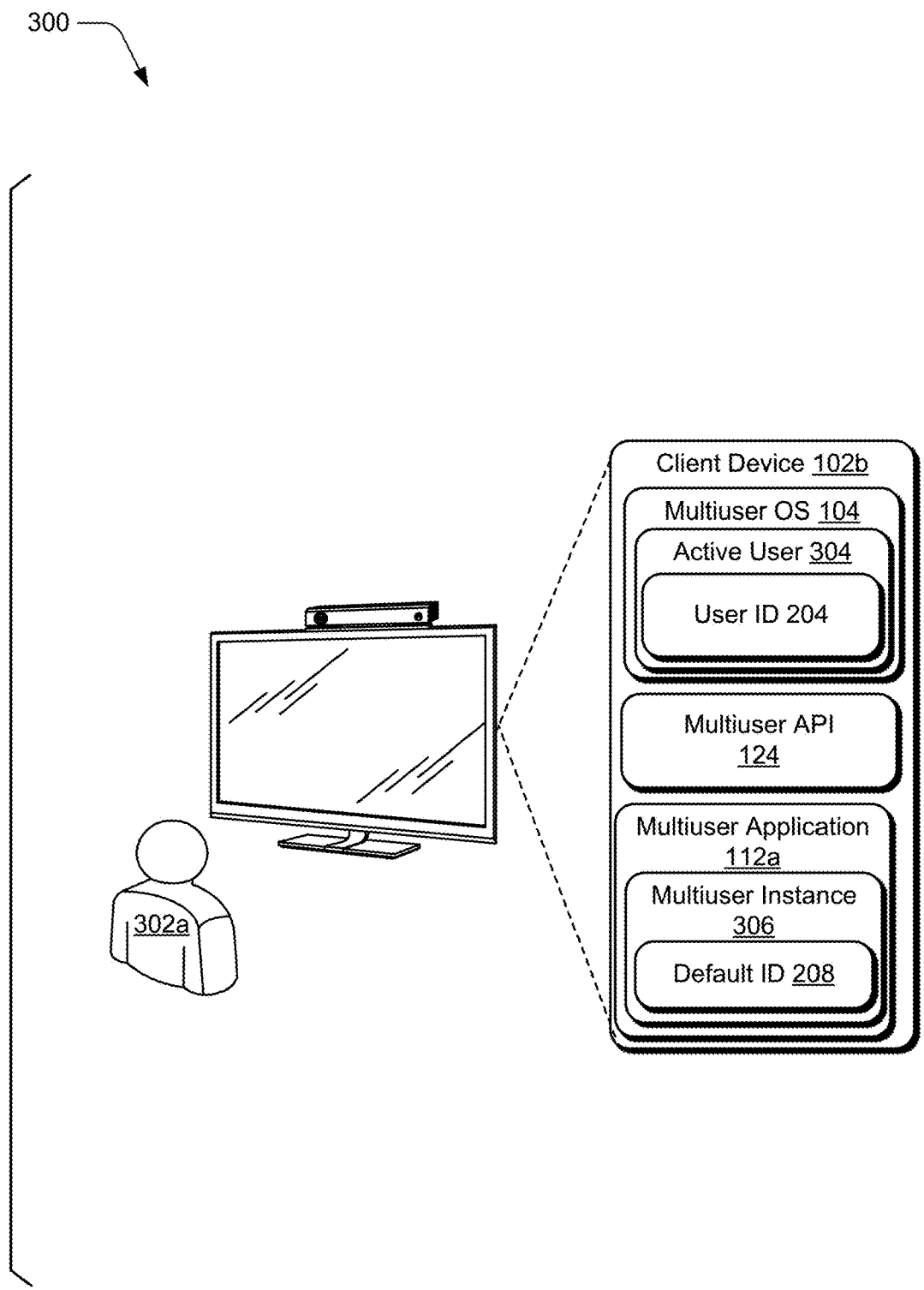
FIG. 3 depicts an example implementation scenario for user interaction with a multiuser application in accordance with one or more embodiments.

FIG. 3 depicts an example scenario 300 for user interaction with a multiuser application in accordance with one or more implementations. In the scenario 300, a user 302*a* authenticates with the multiuser OS 104 of the client device 102*b* using the user ID 204. Thus, the user ID 204 is designated as an active user 304 of the multiuser OS 104. In at least some implementations, designating the user ID 204 as the active user 304 causes a functional and visual environment of the multiuser OS 104 to be customized to the user ID 204. For example, user settings specific to the user ID 204 can be applied to the multiuser OS 104. Examples of user settings include user preferences, user content, user applications, user permissions (e.g., file permissions, network location permissions, and so forth), user-specified visual arrangement, and so forth.

Continuing with the scenario 300, the user 302*a* performs an action to initiate execution of the multiuser application 112*a*, which causes a multiuser instance 306 of the multiuser application 112*a* to be launched. Generally, the multiuser instance 306 represents a running instance of the multiuser application 112*a*. Similarly to the scenario 200 discussed above, the multiuser instance 306 launches as the default ID 208. The multiuser instance 306, for example, is not authenticated to one specific user. The multiuser OS 104, however, communicates with the multiuser instance 306 via the multiuser API 124 to notify the multiuser instance 306 that the user ID 204 is the active user 304. This causes the multiuser instance 306 to tailor certain settings of the multiuser instance 306 to the user ID 204. Examples of such settings include user preferences, user content, user applications, user permissions (e.g., file permissions, network location permissions, and so forth), user-specified visual arrangement, and so forth. Thus, the multiuser instance 306 executes based on the default ID 208, but can provide certain customized settings based on the user ID 204 being the active user 304. The user 302*a*, for example, can interact with the multiuser instance 306 in various ways, such as to access the user's content, files, network locations, and so forth.

As further detailed below, multiple users can interact with the multiuser instance 306, and different active users of the multiuser OS 104 can be designated while the multiuser instance 306 is active.

Figure 4:
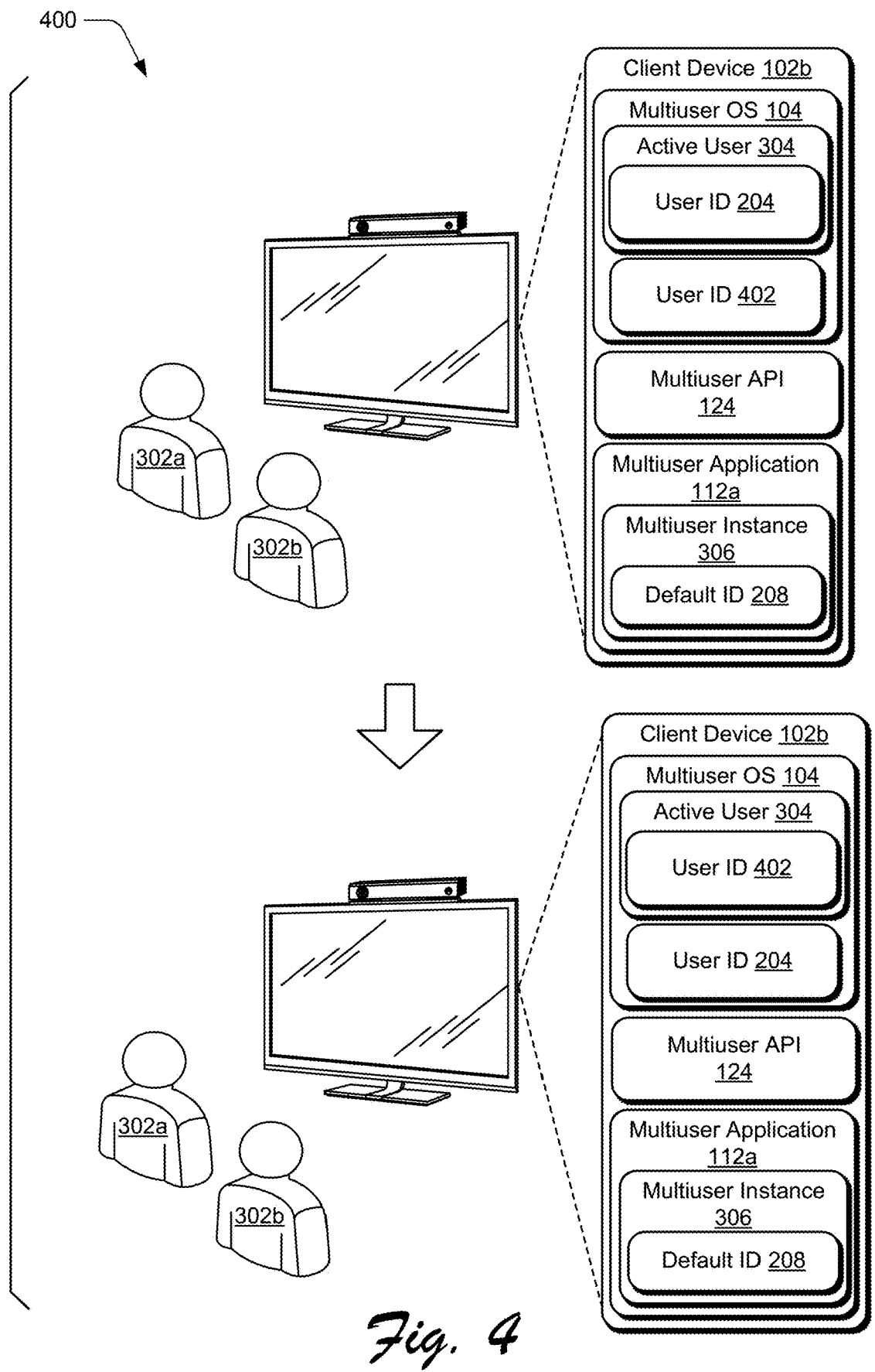
FIG. 4 depicts an example implementation scenario for interaction by multiple users with a multiuser application in accordance with one or more embodiments.

FIG. 4 depicts an example implementation scenario 400 for interaction by multiple users with a multiuser application in accordance with one or more implementations. Generally, the scenario 400 represents a continuation of the scenarios 200, 300.

In the upper portion of the scenario 400, and while the user ID 204 is the active user 304 for the multiuser OS 104, another user 302*b* authenticates with the multiuser OS 104 via a user ID 402. In this particular implementation, the user ID 204 remains the active user 304, and the user IDs 204, 402 are authenticated with the multiuser OS 104. According to various implementations, both users 302*a*, 302*b* may interact with the multiuser instance 306 via their respective user IDs 204, 402 as recognized by the multiuser OS 104.

In at least some implementations, user interaction with the multiuser instance 306 is implemented via an input device and/or input mechanism that is linked to a specific user. For instance, the users 302*a*, 302*b* each use different respective input devices that are tied to their respective user IDs 204, 402 such that when each of the users interact with the client device 102*b*, the multiuser OS 104 recognizes the interaction as being linked to one of the user IDs 204, 402. Examples of an input device include a mouse, a digital pen, a game controller, and so on.

When the user 302*a*, for example, interacts with the client device 102*b* to provide input to the multiuser instance 306, the multiuser OS 104 recognizes the interaction as being linked to the user ID 204. The multiuser OS 104 notifies the multiuser instance 306 via the multiuser API 124 that the input is from the user ID 204. Thus, the multiuser instance 306 attributes the input to the user ID 204. Generally, input attribution enables the multiuser instance 306 to perform various actions on behalf of the user ID 204, such as enabling access to settings and content linked to the user ID 204, enabling access to files and network locations linked to the user ID 204, and so forth.

Further, when the user 302b interacts with the client device 102b to provide input to the multiuser instance 306, the multiuser OS 104 recognizes the interaction as being linked to the user ID 402. The multiuser OS 104 notifies the multiuser instance 306 via the multiuser API 124 that the input is from the user ID 402. Thus, the multiuser instance 306 attributes the input to the user ID 402, such as to tailor the application experience to the user 302b. Thus, the multiuser instance 306 executes as the default ID 208, but is able to recognize interactions by specific users and tailor an application experience to the specific users.

Additionally or alternatively to using input devices to recognize user-specific input interactions, other types of interactions may be recognized by the multiuser OS 104, such as based on biometric recognition during user input (e.g., fingerprint recognition, eye recognition, facial recognition, and so forth), gesture recognition tied to specific user identities (such as detected via a camera of the client device 102b), voice recognition that differentiates between the users 302a, 302b, and so forth.

Proceeding to the lower portion of the scenario 400, the user 302b performs an action that causes the active user 304 to switch from the user ID 204 to the user ID 402. The user 302b, for instance, provides input to the multiuser OS 104 that causes the active user 304 to switch to the user ID 402. Various types of input to switch the active user 304 can be employed, such as selection of a selectable control displayed by the client device 102b, selection of a specific button on an input device, recognition of a specific user gesture, and so forth.

Accordingly, and responsive to switching the active user 304 to the user ID 402, the multiuser OS 104 is reconfigured to reflect that the user ID 402 is now the active user 304. For example, one or more settings of the multiuser OS 104 are changed to reflect that the user ID 402 is the active user 304. In at least some implementations, this includes visually reconfiguring a GUI of the multiuser OS 104 to reflect the user ID 402, such as displaying a user icon for the user ID 402. Further, various permissions for the multiuser OS 104 can be configured via the user ID 402, such as to allow the multiuser OS 104 to access content, files, network locations, and so forth, associated with the user ID 402.

Further to the scenario 400, the multiuser OS 104 notifies the multiuser instance 306 via the multiuser API 124 that the user ID 402 is the active user. Thus, with the user ID 402 as the active user 304, the user 302b can interact with the multiuser instance 306 in various ways, such as to access the user's content, files, network locations, and so forth. For instance, various functional and/or visual attributes of the multiuser instance 306 are reconfigured from being tailored to the user ID 204, to be tailored to the user ID 402.

While the user ID 402 is the active user 304, the users 302a, 302b may continue to interact with the multiuser instance 306, and the multiuser OS 104 can differentiate between the different interactions and identify for the multiuser instance 306 which of the user IDs 204, 402 that a particular input is attributed to. Thus, while the multiuser instance 306 is executing, multiple users may be concurrently authenticated with the multiuser OS 104, and the active user 304 may dynamically change multiple times during a single execution of the multiuser instance 306.

Figure 5:
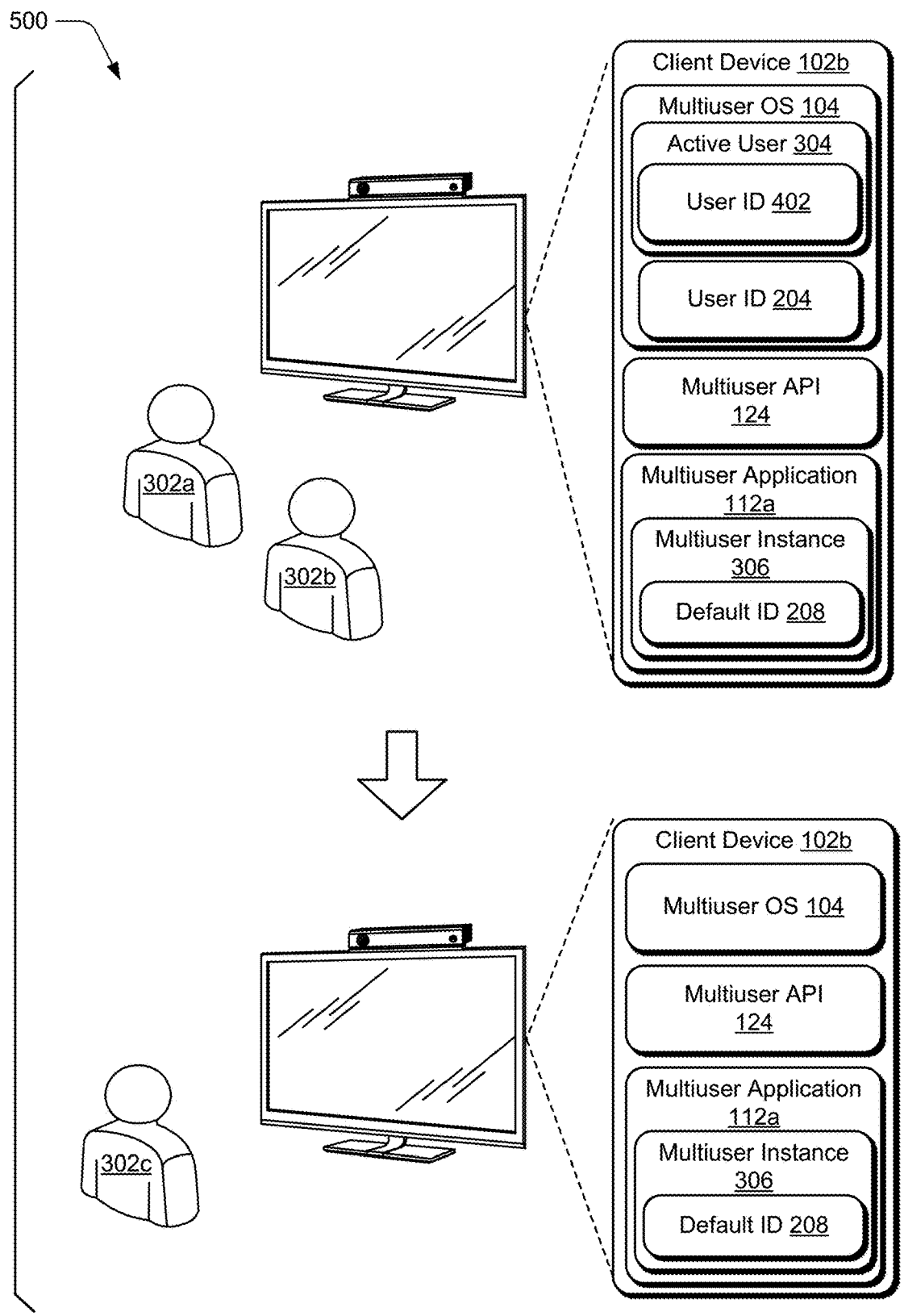
FIG. 5 depicts an example implementation scenario for interaction with a multiuser application in accordance with one or more embodiments.

FIG. 5 depicts an example implementation scenario 500 for interaction with a multiuser application in accordance with one or more implementations. Generally, the scenario 500 represents a continuation of the scenarios 200-400.

In the upper portion of the scenario 500, the multiuser instance 306 is still active on the client device 102b, and the users 302a, 302b are authenticated with the multiuser OS 104 via their respective user IDs 204, 402. Further, the user ID 402 is the active user 304 for the multiuser OS 104.

Proceeding to the lower portion of the scenario 500, the users 302a, 302b log out of the multiuser OS 104 such that the user IDs 204, 402 are no longer authenticated with the multiuser OS 104.

In at least some implementations, when the users 302a, 302b log out and are no longer authenticated with the multiuser instance 306, the multiuser OS 104 is reconfigured to reflect that the multiuser instance 306 is executing in an unauthenticated state. For instance, various permissions that were available when the users 302a, 302b were authenticated are no longer available. Further, various system settings that were applied with the users 302a, 302b were authenticated are reconfigured to reflect a default, unauthenticated system state.

Even though the users 302a, 302b are no longer authenticated, the multiuser instance 306 remains active and users (including the users 302a, 302b, as well as other users) may continue to interact with the multiuser instance 306 as the default ID 208. For instance, in the scenario 500, an unauthenticated user 302c provides input to the client device 102b to interact with the multiuser instance 306. Thus, the multiuser OS 104 detects that the input is from an unauthenticated user, and notifies the multiuser instance 306 that input is received from an unauthenticated user. Thus, the multiuser instance 306 can process the input as input from an unauthenticated user, such as to provide default system functionality based on the unauthenticated input.

While the scenario 500 is discussed with reference to deauthentication of the users 302a, 302b, it is to be appreciated that unauthenticated input can be received while the users 302a, 302b are authenticated with the multiuser OS 104. The multiuser OS 104, for instance, can differentiate between input from the authenticated users 302a, 302b, and input from the unauthenticated user 302c. Further, the multiuser OS 104 can notify the multiuser instance 306 as which of the users 302a, 302b, or 302c provided a particular input.

In at least some implementations, the users 302a, 302b may reauthenticate and additional users may authenticate with the multiuser OS 104 to enable authenticated interaction with the multiuser instance 306 and during the single execution of the multiuser instance 306.

Thus, the scenarios 300-500 illustrate that a multiuser OS enables dynamic authentication and deauthentication, and a multiuser application is executable to allow for multiuser interactions, all during a single execution of the multiuser application. For instance, the scenarios 300-500 are implemented during a continuous execution of the multiuser instance 306 and without requiring a restart of the multiuser application 112a to enable different users to authenticate with the multiuser OS 104a and interact with the multiuser instance 306. Further, the multiuser application 112a can run as the multiuser instance 306 without requiring user authentication directly with the multiuser application 112a, and can receive notifications from the multiuser OS 104 of input from a specific user ID such that the multiuser instance 306 can attribute the input to the specific user ID without the user ID being authenticated with the multiuser instance 306.

Having discussed some example implementation scenarios, consider now a discussion of some example procedures in accordance with one or more embodiments. The example procedures may be employed in the environment 100 of FIG. 1, the system 800 of FIG. 8, and/or any other suitable environment. The procedures, for instance, represent example procedures for implementing the implementation scenarios described above. In at least some implementations, the steps described for the various procedures are implemented automatically and independent of user interaction. According to various implementations, the procedures may be performed locally (e.g., at the client device 102), at a network-based service, and/or via cooperation between the client device 102 and a network-based service.

Figure 6:
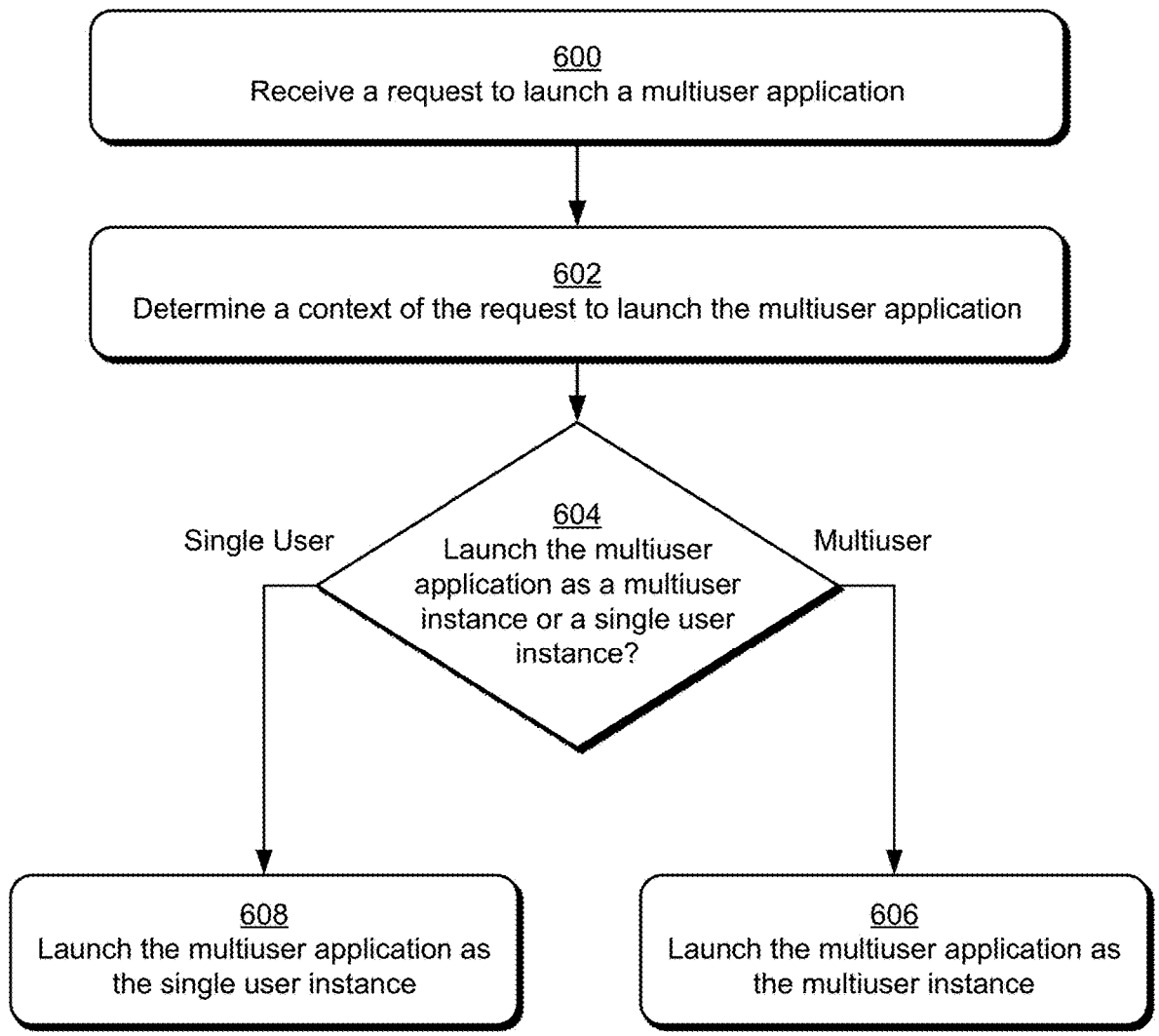
FIG. 6 is a flow diagram that describes steps in a method for optimizing encoding of obfuscated media in accordance with one or more embodiments.

FIG. 6 is a flow diagram that describes steps in a method for launching a multiuser application in accordance with one or more implementations. In at least some implementations, the method can be performed by the multiuser OS 104 executing on the client device 102.

Step 600 receives a request to launch a multiuser application. A user, for instance, interacts with the client device 102 to perform an action to initiate launching a multiuser application. Examples of such an action include selecting an icon (e.g., a tile) that represents the multiuser application, providing a gesture or voice input requesting the launch, and so forth. Alternatively or additionally, the request to launch the multiuser application can be initiated by an automated process, such as from a different application.

Step 602 determines a context of the request to launch the multiuser application. Generally, different contexts can be considered, such as a device type of a device on which the multiuser application is to be launched, a default setting of the multiuser application, a user preference for a way to launch the multiuser application, and so forth.

Step 604 ascertains whether to launch the multiuser application as a multiuser instance or a single user instance based on the context of the request. The application policies 108, for example, can be evaluated based on the context of the request to ascertain whether to launch the multiuser application as a multiuser instance or a single user instance. Generally, the application policies 108 specify contexts in which the multiuser application is to be launched as a multiuser instance, and different contexts in which the multiuser application is to launch as a single user instance.

For instance, consider that the application policies 108 specify that for certain device types, the multiuser application is to launch as a multiuser instance. Examples of device types for a multiuser instance include devices that are designed for concurrent multiuser interaction scenarios, such as large-scale touchscreen devices, meeting room collaboration devices, virtual reality devices (e.g., a virtual reality headset device), and so forth. Further, consider that the application policies 108 specify that for other device types, the multiuser application is to launch as a single user instance. Examples of device types for a single user instance include devices that are designed for single user interaction scenarios, such as small-scale touchscreen devices (e.g., a tablet device), smartphones, desktop computers, wearable devices (e.g., a smart watch), and so forth. Thus, based on a typical usage scenario for a particular device, the multiuser application can be launched into either a multiuser instance or a single user instance.

If the context of the request indicates that the multiuser application is to launch as a multiuser instance ("Multiuser"), step 606 launches the multiuser application as the multiuser instance. In at least some implementations, the multiuser instance is launched and executes according to a default system ID, even if a user ID is authenticated with a device on which the multiuser instance is launched. As detailed throughout, multiple different user IDs can interact with the multiuser instance while the multiuser instance executes according to the default system ID.

If the context of the request indicates that the multiuser application is to launch as a single user instance ("Singe User"), step 608 launches the multiuser application as the single user instance. In at least some implementations, the single user instance is launched and executes according to a user ID that is authenticated with a device on which the multiuser instance is launched.

Figure 7:
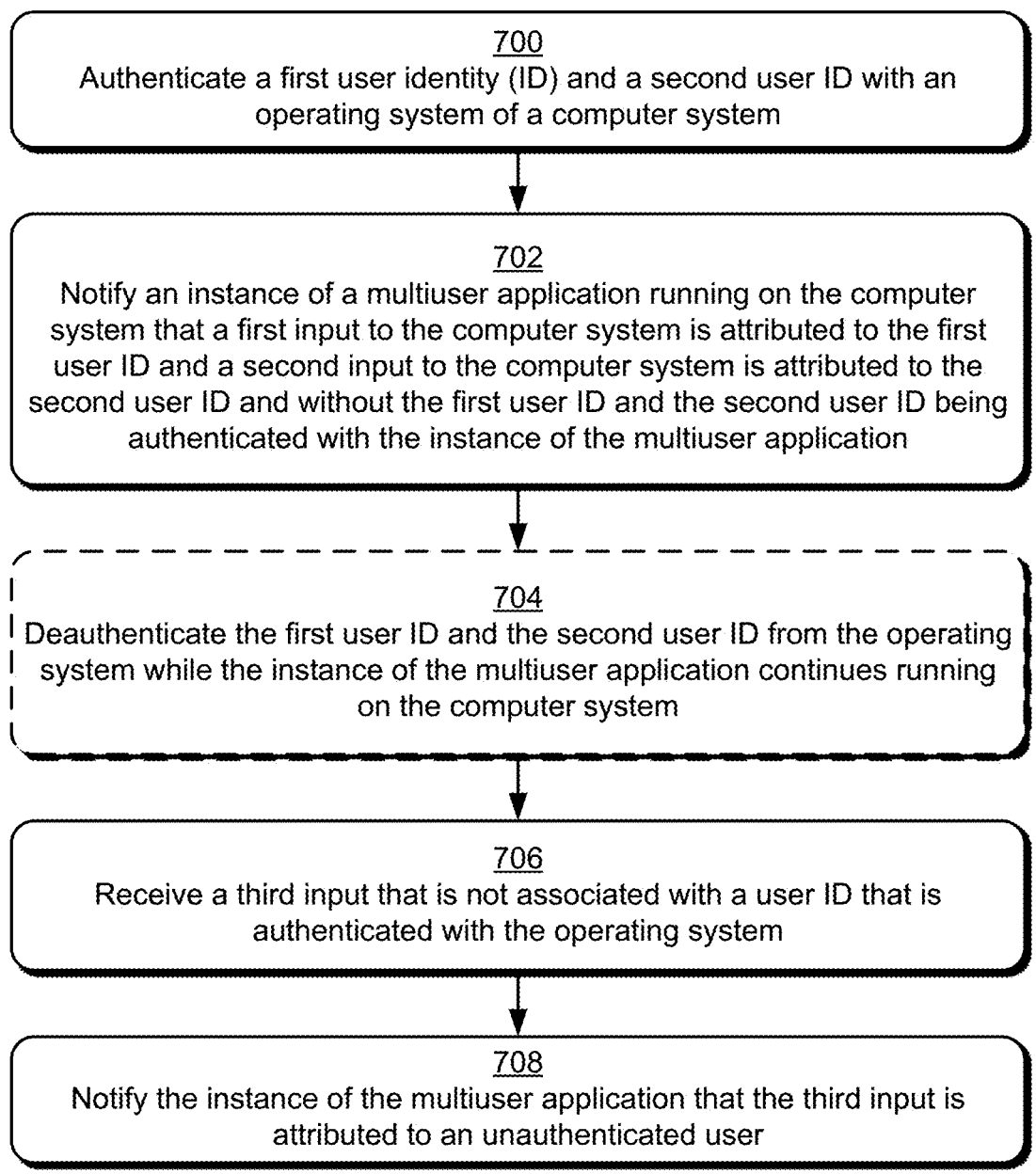
FIG. 7 is a flow diagram that describes steps in a method for interaction with a multiuser application in accordance with one or more embodiments.

FIG. 7 is a flow diagram that describes steps in a method for interaction with a multiuser application in accordance with one or more implementations. In at least some implementations, the method can be performed by the multiuser OS 104 executing on the client device 102.

Step 700 authenticates a first user identity (ID) and a second user ID with an operating system of a computer system. Different users, for example, interact and authenticate with the client device 102, such as by providing different authentication factors to the client device 102 to authenticate with the multiuser OS 104.

Step 702 notifies an instance of a multiuser application running on the computer system that a first input to the computer system is attributed to the first user ID and a second input to the computer system is attributed to the second user ID and without the first user ID and the second user ID being authenticated with the instance of the multiuser application. The multiuser OS 104, for instance, detects input from different users associated with the different user IDs and determines which user ID is associated with which input. As discussed above, the multiuser OS 104 can differentiate inputs associated with different user IDs in various ways, such as based on input devices associated with different users, biometric information, and so forth.

Thus, the multiuser OS 104 notifies the instance of the multiuser application that specific inputs are linked to specific user IDs. In at least some implementations, communication between the multiuser OS 104 and the instance of the multiuser application occurs via the multiuser API 124. The instance of the multiuser application can then perform various actions based on the input, such as to tailor an application experience to the first user ID and/or the second user ID.

Step 704 deauthenticates the first user ID and the second user ID from the operating system while the instance of the multiuser application continues running on the computer system. Users associated with the first user ID and the second user ID, for example, sign out of the operating system such that the user IDs are no longer authenticated with the operating system. The instance of the multiuser application, however, continues to execute. In at least some implementations, step 704 is optional.

Step 706 receives a third input that is not associated with a user ID that is authenticated with the operating system. An unauthenticated user, for example, provides input to the client device 102. The multiuser OS 104 detects the input and determines that the input is not associated with an authenticated user ID. For instance, when the third user input is received, no user IDs are currently authenticated with the multiuser OS 104. Alternatively, a user ID is authenticated with the multiuser OS 104, but the third input is received from a user that is not associated with the authenticated user ID.

In at least some implementations, step 704 is optional. For instance, while the first user ID and the second user ID are still authenticated with the multiuser OS 104, the third input can be received from a different user that is not authenticated with the multiuser OS 104. Thus, the multiuser OS 104 can differentiate between an input from an authenticated user and an input from an unauthenticated user.

Step 708 notifies the instance of the multiuser application that the third input is attributed to an unauthenticated user. The multiuser OS 104, for example, notifies the instance of the multiuser application that the input is from a user that is not authenticated. The instance of the multiuser application can process the input as associated with an unauthenticated user, such as to provide default application functionality that is not tailored to a specific user.

Thus, implementations for multiuser application platform described herein provide a multiuser interaction platform that enables multiuser applications to be designed that can execute in either a multiuser mode or a single user mode dependent on various criteria. Further, using a multiuser OS that handles user authentication and user IDs enables multiuser applications to receive input that is attributed to different user IDs without requiring the user IDs to be authenticated directly with the multiuser application.

Having described some example procedures, consider now an example system and device on which the various implementation scenarios and procedures may be implemented.

Figure 8:
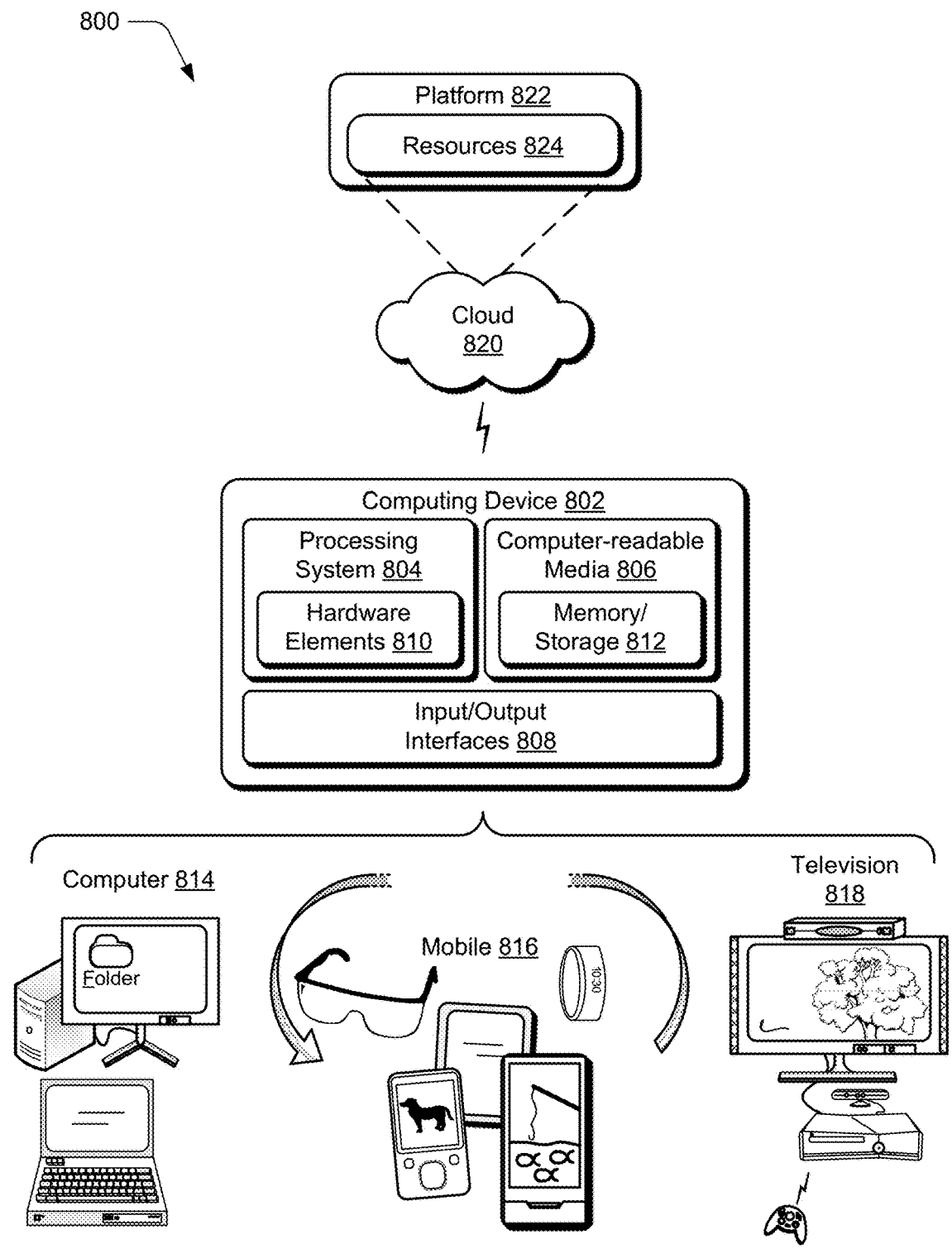
FIG. 8 illustrates an example system and computing device as described with reference to FIG. 1, which are configured to implement embodiments of techniques described herein.

FIG. 8 illustrates an example system generally at 800 that includes an example computing device 802 that is representative of one or more computing systems and/or devices that may implement various techniques described herein. For example, the client device 102 discussed above with reference to FIG. 1 can be embodied as the computing device 802. The computing device 802 may be, for example, a server of a service provider, a device associated with the client (e.g., a client device), an on-chip system, and/or any other suitable computing device or computing system.

The example computing device 802 as illustrated includes a processing system 804, one or more computer-readable media 806, and one or more Input/Output (I/O) Interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 806 is illustrated as including memory/storage 812. The memory/storage 812 represents memory/storage capacity associated with one or more computer-readable media. The memory/storage 812 may include volatile media (such as random access memory (RAM)) and/or nonvolatile media (such as read only memory (ROM), Flash memory, optical disks, magnetic disks, and so forth). The memory/storage 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "entity," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 810 and computer-readable media 806 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of modules that are executable by the computing device 802 as software may be achieved at least partially in hardware, e.g., through use of computer-readable storage media and/or hardware elements 810 of the processing system. The instructions and/or functions may be executable/operable by one or more articles of manufacture (for example, one or more computing devices 802 and/or processing systems 804) to implement techniques, modules, and examples described herein.

As further illustrated in FIG. 8, the example system 800 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 800, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 802 may assume a variety of different configurations, such as for computer 814, mobile 816, and television 818 uses. Each of these configurations includes devices that may have generally different constructs and capabilities, and thus the computing device 802 may be configured according to one or more of the different device classes. For instance, the computing device 802 may be implemented as the computer 814 class of a device that includes a personal computer, desktop computer, a multi-screen computer, laptop computer, netbook, and so on.

The computing device 802 may also be implemented as the mobile 816 class of device that includes mobile devices, such as a mobile phone, portable music player, portable gaming device, a tablet computer, a wearable device, a multi-screen computer, and so on. The computing device 802 may also be implemented as the television 818 class of device that includes devices having or connected to generally larger screens in casual viewing environments. These devices include televisions, set-top boxes, gaming consoles, and so on.

The techniques described herein may be supported by these various configurations of the computing device 802 and are not limited to the specific examples of the techniques described herein. For example, functionalities discussed with reference to the client device 102 may be implemented all or in part through use of a distributed system, such as over a "cloud" 820 via a platform 822 as described below.

The cloud 820 includes and/or is representative of a platform 822 for resources 824. The platform 822 abstracts underlying functionality of hardware (e.g., servers) and software resources of the cloud 820. The resources 824 may include applications and/or data that can be utilized while computer processing is executed on servers that are remote from the computing device 802. Resources 824 can also include services provided over the Internet and/or through a subscriber network, such as a cellular or Wi-Fi network.

The platform 822 may abstract resources and functions to connect the computing device 802 with other computing devices. The platform 822 may also serve to abstract scaling of resources to provide a corresponding level of scale to encountered demand for the resources 824 that are implemented via the platform 822. Accordingly, in an interconnected device embodiment, implementation of functionality described herein may be distributed throughout the system 800. For example, the functionality may be implemented in part on the computing device 802 as well as via the platform 822 that abstracts the functionality of the cloud 820.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A system for launching an application as one of a multiuser instance or a single user instance based on a launch context, the system comprising: at least one processor; and one or more computer-readable storage media including instructions stored thereon that are executable by the at least one processor to cause the system to: receive a request to launch a multiuser application on the system; determine a context of the request to launch the multiuser application; ascertain whether to launch the multiuser application as a multiuser instance or a single user instance based on the context of the request; and launch the multiuser application as either the multiuser instance or the single user instance in response to said ascertaining.

In addition to any of the above described systems, any one or combination of: wherein the context of the request comprises a device type of a device on which the multiuser application is to be launched; wherein the context of the request comprises a default setting of the multiuser application; wherein said ascertaining is based on one or more application policies that specify, based on the context of the request, that the multiuser application is to be launched into one of the multiuser instance or the single user instance; wherein the multiuser application is launchable into the multiuser instance or the single user instance from a same set of code that is executable differently based on different launch contexts; wherein the request to launch the multiuser application is associated with a user identity (ID), and wherein launching the multiuser application as the multiuser instance causes the multiuser instance to execute according to a default system identity (ID) that is different than the user ID; wherein the request to launch the multiuser application is associated with a user identity (ID), and wherein launching the multiuser application as the single user instance causes the single user instance to execute according to the user ID; wherein said launching comprises launching the multiuser application as the multiuser instance, and wherein the instructions are further executable by the at least one processor to cause the system to: authenticate multiple user identities (IDs) with an operating system; and cause the operating system to communicate with the multiuser instance to attribute individual user inputs to different respective user IDs of the multiple user IDs.

A method implemented by a computing device for attributing input to different user identities, the method comprising: authenticating a first user identity (ID) and a second user ID with an operating system of a computer system; and notifying an instance of a multiuser application running on the computer system that a first input to the computer system is attributed to the first user ID and a second input to the computer system is attributed to the second user ID and without the first user ID and the second user ID being authenticated with the instance of the multiuser application.

In addition to any of the above described methods, any one or combination of: wherein said notifying is performed via an application programming interface (API) that enables communication between the operating system and the instance of the multiuser application; wherein the multiuser application executes according to a default system identity of the computer system that is different than the first user ID and the second user ID; further comprising notifying the instance of the multiuser application that the first user ID is an active user of the operating system such that one or more attributes of the instance of the multiuser application are tailored to the first user ID; further comprising: receiving a third user input that is not associated with a user ID that is authenticated with the operating system; and notifying the instance of the multiuser application that the third user input is attributed to an unauthenticated user; further comprising: deauthenticating the first user ID and the second user ID from the operating system while the instance of the multiuser application continues running on the computer system; receiving a third user input that is not associated with a user ID that is authenticated with the operating system; and notifying the instance of the multiuser application that the third user input is attributed to an unauthenticated user. A method as recited in claim 9, wherein the first user input enables the instance of the multiuser application to provide access to content that is linked to the first user ID and without the first user ID being authenticated with the instance of the multiuser application.

A computer system for attributing different user input to different user identities, the computer system comprising: at least one processor; and one or more computer-readable storage media including instructions stored thereon that, responsive to execution by the at least one processor, cause the computer system to implement: an operating system configured to enable multiple user identities (IDs) to be concurrently in an authenticated state with the operating system; and an application programming interface (API) configured to enable communication between the operating system and an executing multiuser instance of a multiuser application, the communication including the operating system notifying the executing multiuser instance of the multiuser application that different inputs to the computer system are attributed to different respective user IDs of the multiple user IDs, and without requiring the different respective user IDs to be authenticated with the executing multiuser instance of the multiuser application.

In addition to any of the above described computer systems, any one or combination of: wherein the multiuser application is executable as the multiuser instance or a single user instance dependent on a context of a launch of the multiuser application; wherein the multiuser application is executable as the multiuser instance or a single user instance dependent on a context of a launch of the multiuser application, and wherein the instructions are further executable by the at least one processor to cause the system to implement one or more application policies that specify a first context in which the multiuser application is to launch as the multiuser instance, and a second context in which the multiuser application is to launch as the single user instance; wherein the operating system is further configured to operate in an unauthenticated state wherein no user identity is authenticated with the operating system, and to communicate unauthenticated user input to the executing multiuser instance of the multiuser application; wherein the operating system is configured to notify the executing instance of the multiuser application of the different inputs while the executing instance of the multiuser application is executing according to a default system identity (ID).

What is claimed is:
1. A system comprising:
   at least one processor; and one or more computer-readable storage media including instructions stored thereon that are executable by the at least one processor to cause the system to:
receive, by a multiuser operating system, a request to launch a multiuser application on the system, the request to launch the multiuser application being associated with a user identity (ID);
determine, by the multiuser operating system, a context of the request to launch the multiuser application;
ascertain, by the multiuser operating system, whether to launch the multiuser application as a multiuser instance or a single user instance based on the context of the request; and
launch, by the multiuser operating system, the multiuser application as either the multiuser instance or the single user instance in response to said ascertaining, the launch of the multiuser application as the multiuser instance causing the multiuser instance of the multiuser application to execute according to a default system identity (ID) based on the request to launch the multiuser application being associated with the user identity (ID), the default system identity (ID) being different than the user identity (ID).

2. The system as recited in claim 1, wherein the context of the request comprises a device type of a device on which the multiuser application is to be launched.

3. The system as recited in claim 1, wherein the context of the request comprises a default setting of the multiuser application.

4. The system as recited in claim 1, wherein said ascertaining is based on one or more application policies that specify, based on the context of the request, that the multiuser application is to be launched into one of the multiuser instance or the single user instance.

5. The system as recited in claim 1, wherein the multiuser application is launchable into the multiuser instance or the single user instance from a same set of code that is executable differently based on different launch contexts.

6. The system as recited in claim 1, wherein the request to launch the multiuser application is associated with the user identity (ID), and wherein launching the multiuser application as the single user instance causes the single user instance to execute according to the user ID.

7. The system as recited in claim 1, wherein said launching comprises launching the multiuser application as the multiuser instance, and wherein the instructions are further executable by the at least one processor to cause the system to:
authenticate, by the multiuser operating system, multiple user identities (IDs); and
communicate, by the multiuser operating system, with the multiuser instance to attribute individual user inputs to different respective user IDs of the multiple user IDs.

8. A method, comprising:
receiving, by a multiuser operating system, a request to launch a multiuser application on a system, the request to launch the multiuser application being associated with a user identity (ID);
determining, by the multiuser operating system, a context of the request to launch the multiuser application;
ascertaining, by the multiuser operating system, whether to launch the multiuser application as a multiuser instance or a single user instance based on the context of the request; and
launching, by the multiuser operating system, the multiuser application as either the multiuser instance or the single user instance in response to said ascertaining, the launch of the multiuser application as the multiuser instance causing the multiuser instance of the multiuser application to execute according to a default system identity (ID) based on the request to launch the multiuser application being associated with the user identity (ID), the default system identity (ID) being different than the user identity (ID).

9. The method as recited in claim 8, wherein the context of the request comprises a device type of a device on which the multiuser application into be launched.

10. The method as recited in claim 8, wherein the context of the request comprises a default setting of the multiuser application.

11. The method as recited in claim 8, wherein said ascertaining is based on one or more application policies that specify, based on the context of the request, that the multiuser application is to be launched into one of the multiuser instance or the single user instance.

12. The method as recited in claim 8, wherein the multiuser application is launchable into the multiuser instance or the single user instance from a same set of code that is executable differently based on different launch contexts.

13. The method as recited in claim 8, wherein the request to launch the multiuser application is associated with the user identity (ID), and wherein launching the multiuser application as the single user instance causes the single user instance to execute according to the user ID.

14. The method as recited in claim 8, wherein said launching comprises launching the multiuser application as the multiuser instance, and wherein the method further comprises:
authenticating, by the multiuser operating system, multiple user identities (IDs) with an operating system; and
communicating, by the multiuser operating system, with the multiuser instance to attribute individual user inputs to different respective user IDs of the multiple user IDs.

15. A computer-readable memory device comprising instructions that, when executed by a processor, cause the processor to perform actions comprising:
receiving, by a multiuser operating system, a request to launch a multiuser application on a system, the request to launch the multiuser application being associated with a user identity (ID);
determining, by the multiuser operating system, a context of the request to launch the multiuser application;
ascertaining, by the multiuser operating system, whether to launch the multiuser application as a multiuser instance or a single user instance based on the context of the request; and
launching, by the multiuser operating system, the multiuser application as either the multiuser instance or the single user instance in response to said ascertaining, the launch of the multiuser application as the multiuser instance causing the multiuser instance of the multiuser application to execute according to a default system identity (ID) based on the request to launch the multiuser application being associated with the user identity (ID), the default system identity (ID) being different than the user identity (ID).

16. The computer-readable memory device as recited in claim 15, wherein the context of the request comprises a device type of a device on which the multiuser application is to be launched.

17. The computer-readable memory device as recited in claim 15, wherein the context of the request comprises a default setting of the multiuser application.

18. The computer-readable memory device as recited in claim 15, wherein said ascertaining is based on one or more application policies that specify, based on the context of the request, that the multiuser application is to be launched into one of the multiuser instance or the single user instance.

19. The computer-readable memory device as recited in claim 15, wherein the multiuser application is launchable into the multiuser instance or the single user instance from a same set of code that is executable differently based on different launch contexts.

20. The computer-readable memory device as recited by claim 15, wherein the request to launch the multiuser application is associated with the user identity (ID), and wherein launching the multiuser application as the single user instance causes the single user instance to execute according to the user ID.

* * * * *